(12) United States Patent
Miyatani et al.

(10) Patent No.: US 8,526,118 B2
(45) Date of Patent: Sep. 3, 2013

(54) ZOOM LENS AND IMAGE CAPTURING APPARATUS

(75) Inventors: Sota Miyatani, Tokyo (JP); Koji Toyoda, Kanagawa (JP); Kazuki Yonemoto, Saitama (JP)

(73) Assignee: Sony Corporation, Tokyo (JP)

( * ) Notice: Subject to any disclaimer, the term of this patent is extended or adjusted under 35 U.S.C. 154(b) by 56 days.

(21) Appl. No.: 13/200,918

(22) Filed: Oct. 5, 2011

(65) Prior Publication Data
US 2012/0140337 A1    Jun. 7, 2012

(30) Foreign Application Priority Data
Dec. 7, 2010    (JP) ................................. 2010-272131

(51) Int. Cl.
*G02B 15/14* (2006.01)
(52) U.S. Cl.
USPC .......................................... 359/684; 359/685
(58) Field of Classification Search
USPC .................... 359/684, 685, 687, 676
See application file for complete search history.

(56) References Cited

U.S. PATENT DOCUMENTS
7,679,835 B2 *    3/2010    Ohashi ........................... 359/685

FOREIGN PATENT DOCUMENTS
JP    4007258    9/2007
JP    2009-175648    8/2009

* cited by examiner

*Primary Examiner* — Alicia M Harrington
(74) *Attorney, Agent, or Firm* — Rader, Fishman & Grauer PLLC

(57) ABSTRACT

An inner focus type zoom lens includes a first lens group that has positive refracting power and is normally located at a fixed position, a second lens group that has negative refracting power and is movable in an optical axis direction for zooming, a third lens group that has positive refracting power, a fourth lens group that is movable for correction of a focal position due to the zooming and for focusing, and a fifth lens group that has positive refracting power, in order from an object side, wherein the first lens group includes a negative lens, a first positive lens, and a second positive lens arranged in order from the object side, wherein a first face of the negative lens has a shape of a concave surface turned on the object side, and wherein the zoom lens satisfies the following conditional equation (1) $-10.0 < G1R1/fw < -3.0$.

20 Claims, 13 Drawing Sheets

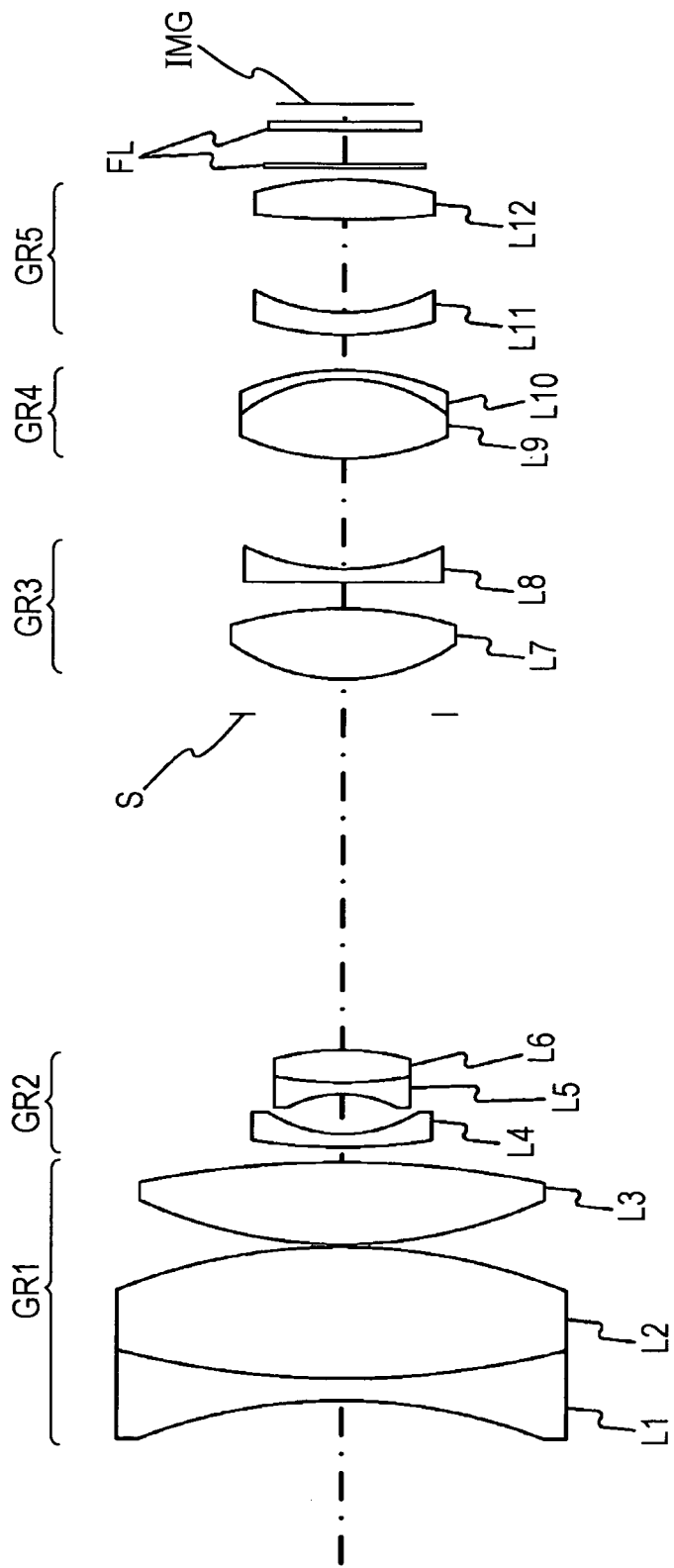

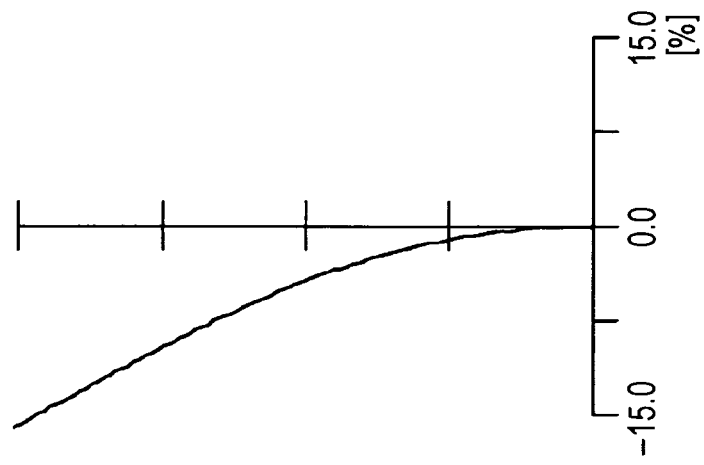
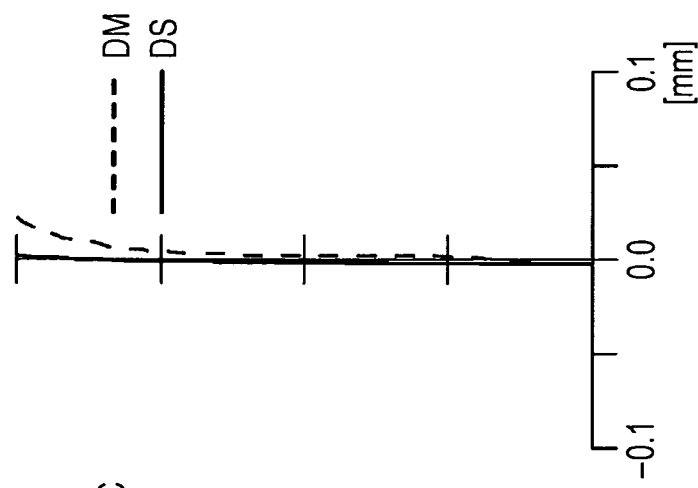
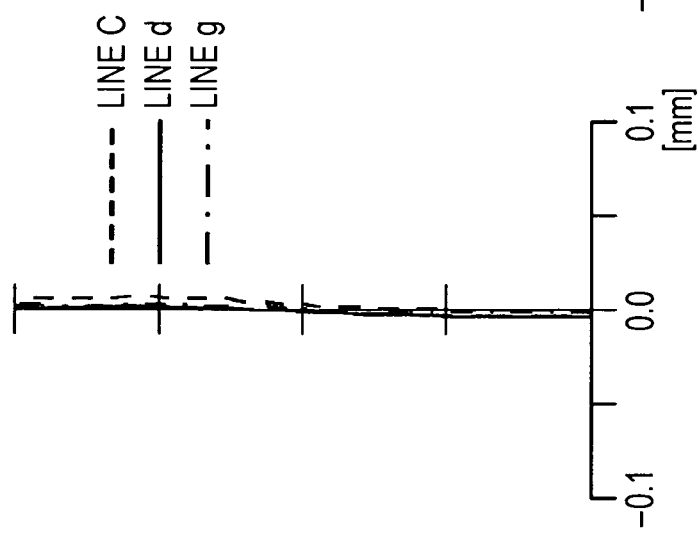

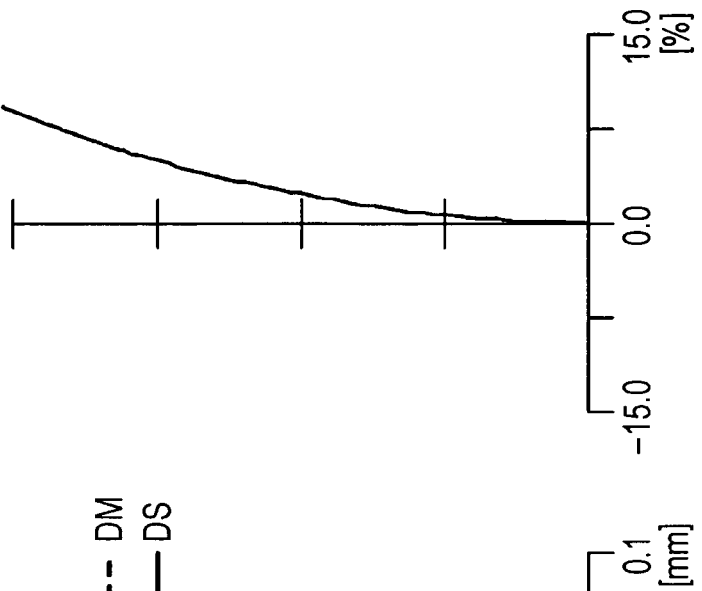

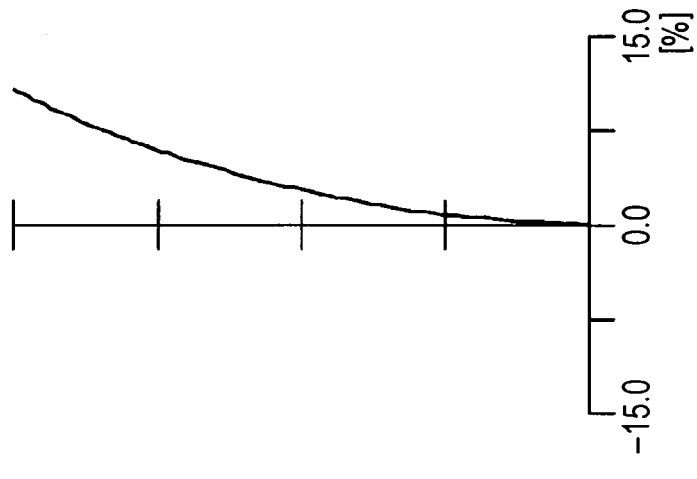
FIG. 4A SPHERICAL ABERRATION Fno.=3.50
FIG. 4B ASTIGMATISM ω=4.31°
FIG. 4C DISTORTION ABERRATION ω=4.31°

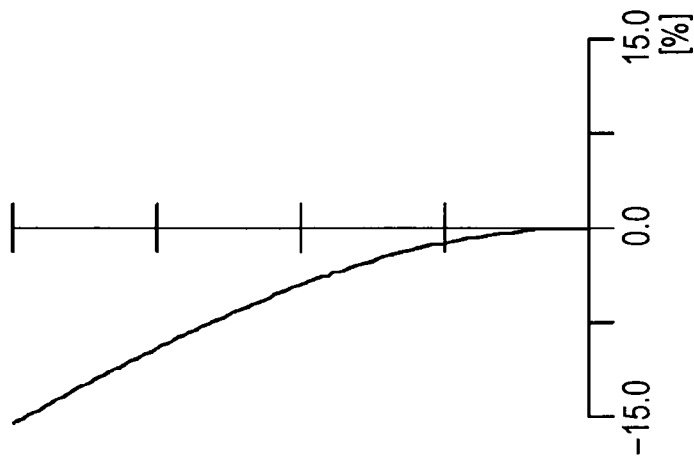
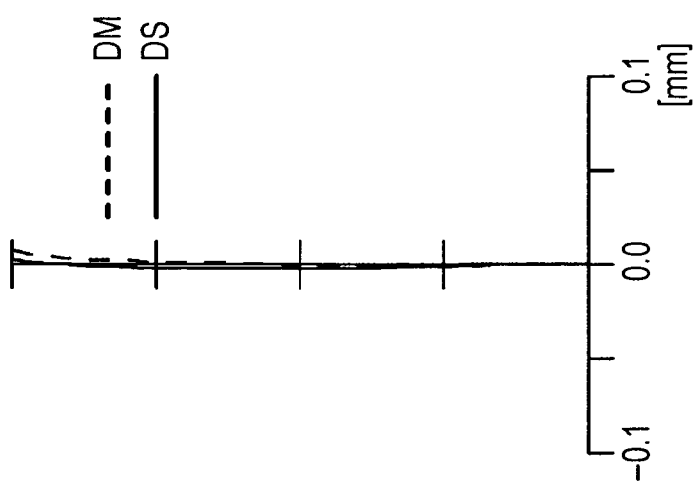
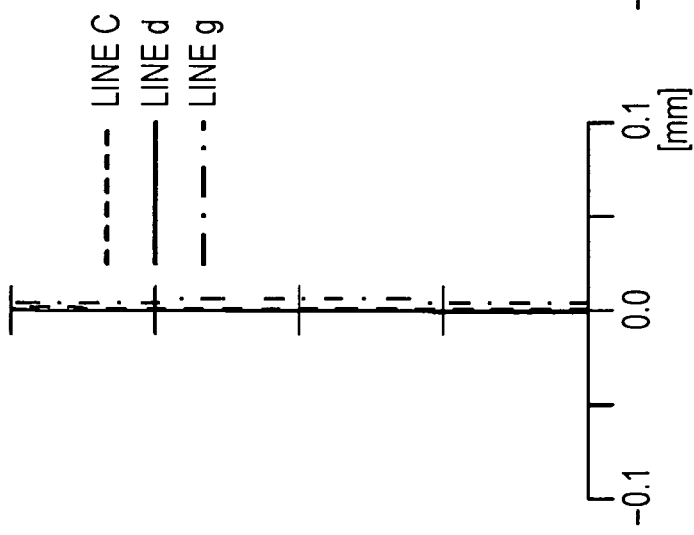

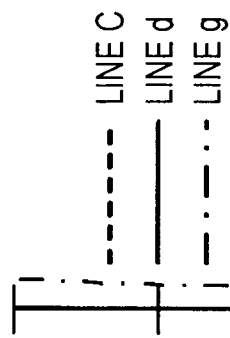
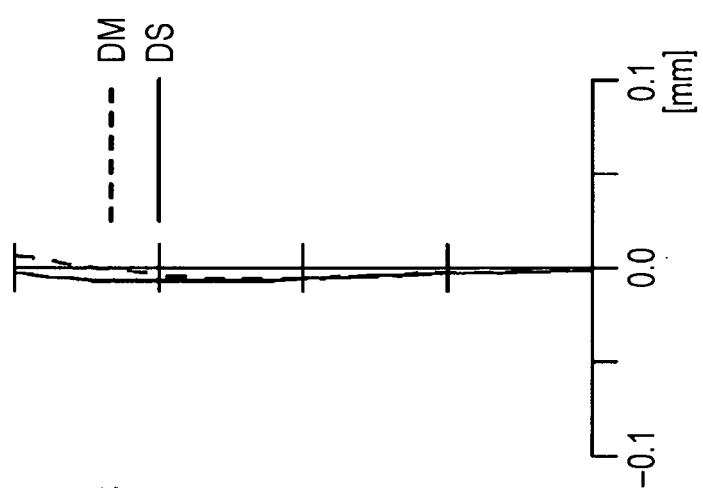
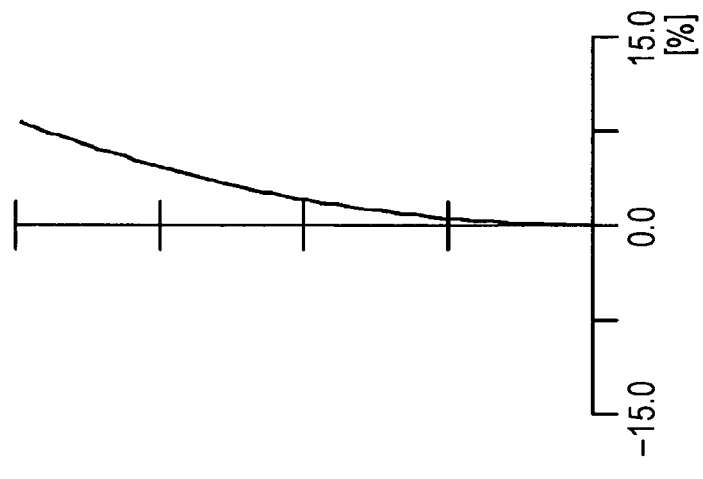

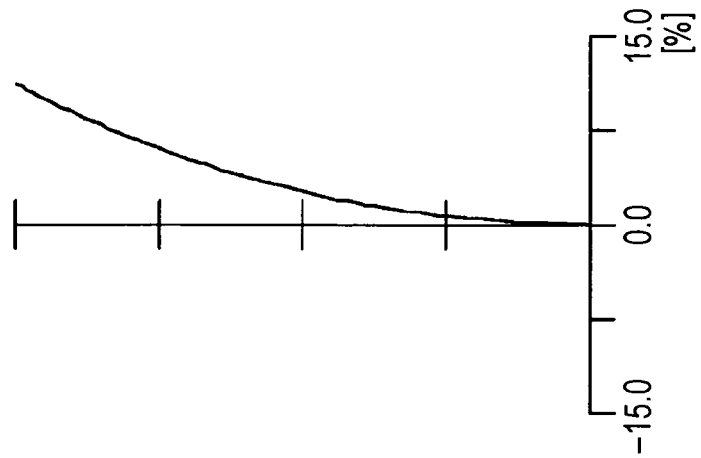

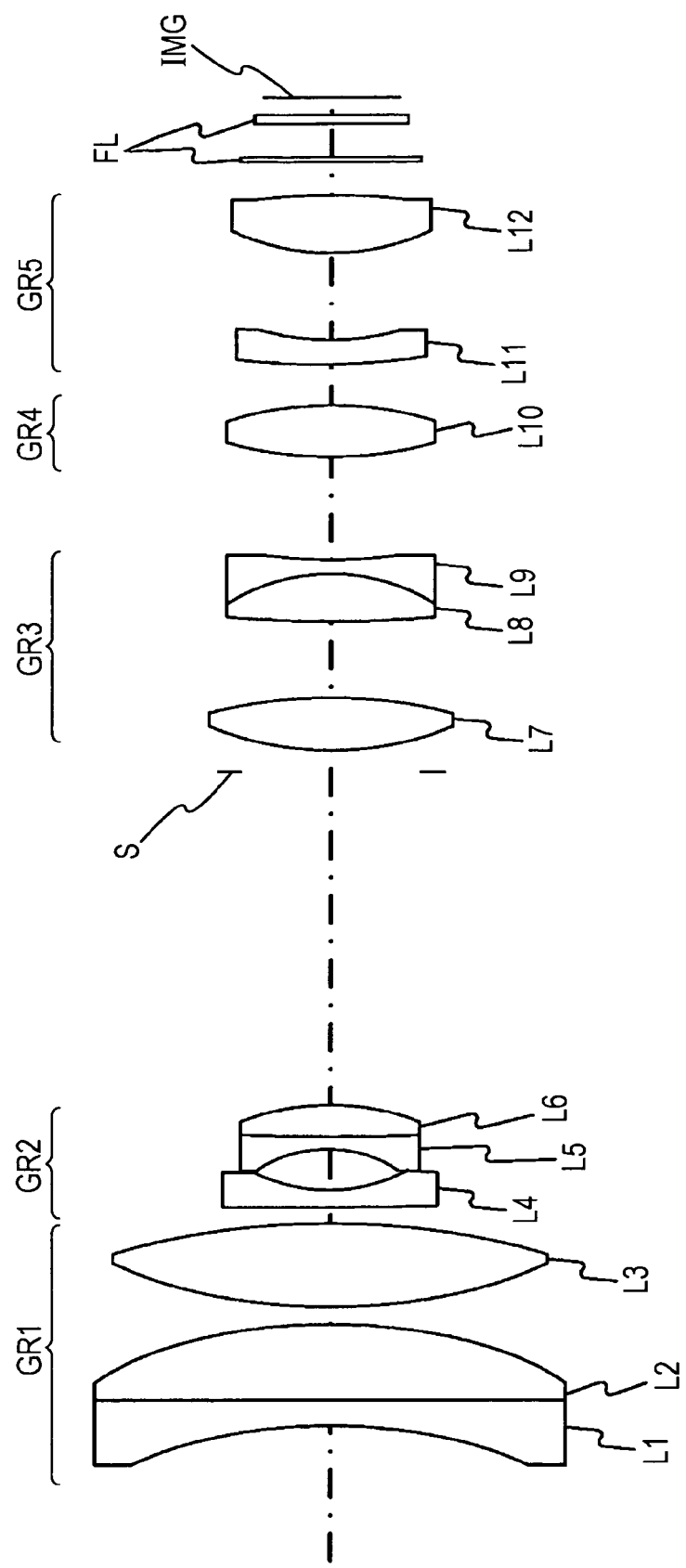

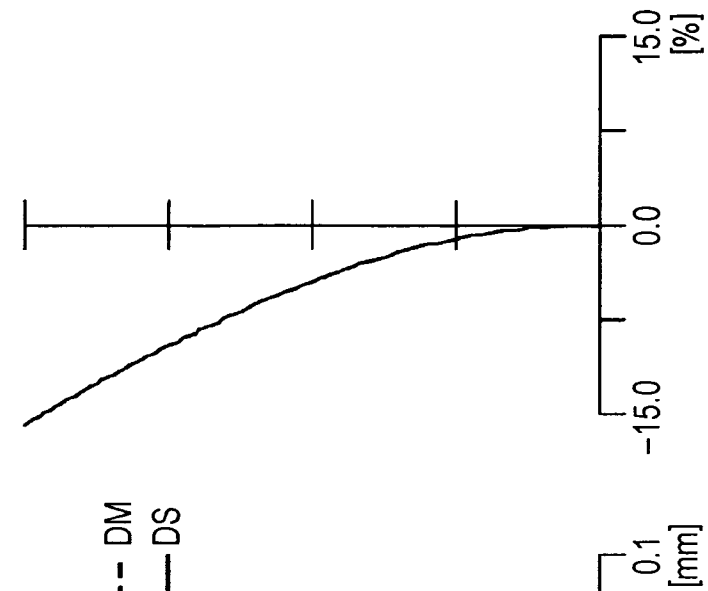

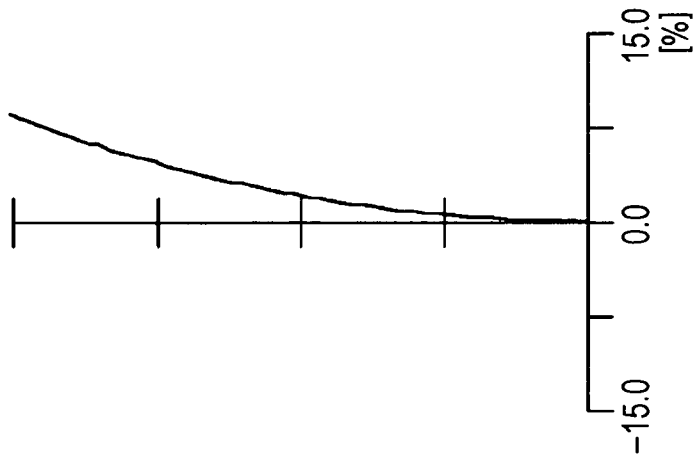
FIG. 11A SPHERICAL ABERRATION
FIG. 11B ASTIGMATISM
FIG. 11C DISTORTION ABERRATION SPHERICAL ABERRATION
Fno.=3.44

ASTIGMATISM
ω=4.25°

DISTORTION ABERRATION
ω=4.25°

ZOOM LENS AND IMAGE CAPTURING APPARATUS

BACKGROUND

The present disclosure relates to a zoom lens and an image capturing apparatus, and more particularly to a zoom lens which optically corrects image blurring due to shale during photographing, and an image capturing apparatus having the zoom lens.

In recent years, small-sized image capturing apparatuses such as video cameras or digital still cameras have been widely spread for household use as well as consumer use. In relation to the small-sized imaging devices, along with the miniaturization of an imaging device, there has been a demand for a wide angle zoom lens of which the overall lens system has a small size, high zoom ratio, and high performance.

As a zoom lens generally used for the video camera, there is an inner focus type zoom lens which performs focusing by moving lens groups other than a first lens group closest to an object side. The inner focus type zoom lens allows the overall lens system to be easily miniaturized and an imaging device having a large number of pixels to have appropriate image forming performance.

As the inner focus type zoom lens, a four-group inner zoom lens type is mainly used (for example, refer to Japanese Unexamined Patent Application Publication No. 2009-175628). In the four-group inner zoom lens type, a first lens group and a third lens group are fixed, and a second lens group is moved in the optical axis direction, thereby mainly performing zooming. In addition, correction of a focal position and focusing are performed through zooming by moving a fourth lens group in the optical axis direction.

However, in the four-group inner zoom lens type, the half angle of view at the wide-angle end is only 30 degrees in a configuration of the above-described first lens group. For this reason, if a wide angle of view is attempted, there is a problem in that since light beam height of off-axis light flux incident to the first lens group is increased, an effective diameter of the first group lens is increased.

In contrast, in the four-group inner focus type zoom lens, there has been proposed a lens where the first lens group has a five-lens configuration, thereby achieving a wide angle and miniaturization as well as a high zoom ratio for many variations (for example, refer to Japanese Patent No. 4007258).

SUMMARY

In the above-described related arts, a wide angle and miniaturization are tried through the five-lens configuration of the first lens group in the four-group inner focus type zoom lens. However, the four-group inner focus type zoom lens in the related art has a configuration in which a glass is buried between constituent factors having negative refracting power and constituent factors having positive refracting power which form an afocal system, in order to suppress a tilt angle of light beams passing through the first lens group. For this reason, there is a problem in that the thickness of the second lens of the first lens group is increased. In addition, there is a problem in that the optical anti-shake function for which there has been an increasing demand recently is not sufficiently supported.

It is desirable to achieve reduction in the number of lenses along with a high zoom ratio, a wide angle of view, and miniaturization, in an inner focus type zoom lens having an optical anti-shake function.

According to an embodiment of the present disclosure, there is provided an inner focus type zoom lens including a first lens group that has positive refracting power and is normally located at a fixed position, a second lens group that has negative refracting power and is movable in an optical axis direction for zooming, a third lens group that has positive refracting power, a fourth lens group that is movable for correction of a focal position due to the zooming and for focusing, and a fifth lens group that has positive refracting power, in order from an object side, wherein the first lens group includes a negative lens, a first positive lens, and a second positive lens arranged in order from the object side, wherein a first face of the negative lens has a shape of a concave surface turned on the object side, and wherein the zoom lens satisfies the conditional equation (1) $-10.0 < G1R1/fw < -3.0$, where G1R1 is a curvature radius of a lens surface closest to an object side, and fw is a focal length of the overall lens system at the wide-angle end. Thereby, in the zoom lens, it is possible to achieve a wide angle and miniaturization of a front lens diameter from the viewpoint of the refracting power of the concave surface of the first face of the negative lens of the first lens group.

In addition, in the embodiment, the zoom lens preferably further satisfies the conditional equation (2) $-8.0 < G1R1/fw < -5.0$. This further restricts the range of the conditional equation (1), and thus it is possible to further achieve a wide angle and miniaturization of a front lens diameter.

Further, in the embodiment, the zoom lens preferably further satisfies the conditional equation (3) $0.03 < H1'/f1 < 0.3$. Thereby, it is possible to achieve a wide angle and miniaturization of a front lens diameter from the viewpoint of the main point and the focal length of the first lens group.

In addition, in the embodiment, the zoom lens preferably further satisfies the conditional equation (4) $3.9 < f1L/fw < 5.9$, where f1L is a focal length of a lens closest to an image side of the first lens group. Thereby, it is possible to achieve a wide angle and miniaturization of a front lens diameter from the viewpoint of the refracting power of the lens closest to the image side of the first lens group.

Further, in the embodiment, at least one face in the first lens group is preferably an aspherical surface. Particularly, a lens closest to the image side of the first lens group is preferably an aspherical lens. Thereby, it is possible to correct a spherical aberration at the telephoto end with good efficiency.

In the embodiment, the fifth lens group may include a front group having negative refracting power and a rear group having positive refracting power in order from the object side, and any one of the front group and the rear group may be moved in a direction perpendicular to the optical axis, and thereby an image formed on an image surface may be also moved in the direction perpendicular to the optical axis. Thereby, it is possible to achieve miniaturization or correct image blurring.

According to another embodiment of the present disclosure, there is a provided an inner focus type zoom lens including a first lens group that has positive refracting power and is normally located at a fixed position, a second lens group that has negative refracting power and is movable in an optical axis direction for zooming, a third lens group that has positive refracting power, and a fourth lens group that is movable for correction of a focal position due to the zooming and for focusing, in order from an object side, wherein the first lens group includes a negative lens, a first positive lens, and a second positive lens arranged in order from the object side, wherein a first face of the negative lens has a shape of a concave surface turned on the object side, and wherein the zoom lens satisfies the following conditional equation (1)

$-10.0<G1R1/fw<-3.0$, where G1R1 is a curvature radius of a lens surface closest to an object, and fw is a focal length of the overall lens system at the wide-angle end. Thereby, in the zoom lens, it is possible to achieve a wide angle and miniaturization of a front lens diameter from the viewpoint of the refracting power of the concave surface of the first face of the negative lens of the first lens group.

According to still another embodiment of the present disclosure, there is provided an image capturing apparatus including a zoom lens that includes a plurality of lens groups and performs zooming by varying distances between the plurality of lens groups; and an imaging device that converts an optical image formed by the zoom lens into an electric signal, wherein the zoom lens is an inner focus type zoom lens including a first lens group that has positive refracting power and is normally located at a fixed position, a second lens group that has negative refracting power and is movable in an optical axis direction for zooming, a third lens group that has positive refracting power, a fourth lens group that is movable for correction of a focal position due to the zooming and for focusing, and a fifth lens group that has positive refracting power, in order from an object side, wherein the first lens group includes a negative lens, a first positive lens, and a second positive lens arranged in order from the object side, wherein a first face of the negative lens has a shape of a concave surface turned on the object side, and wherein the zoom lens satisfies the following conditional equation (1) $-10.0<G1R1/fw<-3.0$, where G1R1 is a curvature radius of a lens surface closest to an object side, and fw is a focal length of the overall lens system at the wide-angle end. Thereby, in the zoom lens, it is possible to achieve a wide angle and miniaturization of a front lens diameter from the viewpoint of the refracting power of the concave surface of the first face of the negative lens of the first lens group.

According to the embodiments of the present disclosure, it is possible to achieve reduction in the number of lenses along with a high zoom ratio, a wide angle of view, and miniaturization, in an inner focus type zoom lens.

BRIEF DESCRIPTION OF THE DRAWINGS

FIG. 1 is a diagram illustrating a configuration example of the zoom lens according to a first embodiment of the present disclosure.

FIGS. 2A to 2C are diagrams illustrating the respective aberrations at the wide-angle end of the zoom lens according to the first embodiment of the present disclosure.

FIGS. 3A to 3C are diagrams illustrating the respective aberrations at the intermediate focal length between the wide-angle end and the telephoto end of the zoom lens according to the first embodiment of the present disclosure.

FIGS. 4A to 4C are diagrams illustrating the respective aberrations at the telephoto end of the zoom lens according to the first embodiment of the present disclosure.

FIGS. 6A to 6C are diagrams illustrating the respective aberrations at the wide-angle end of the zoom lens according to the second embodiment of the present disclosure.

FIGS. 7A to 7C are diagrams illustrating the respective aberrations at the intermediate focal length between the wide-angle end and the telephoto end of the zoom lens according to the second embodiment of the present disclosure.

FIGS. 8A to 8C are diagrams illustrating the respective aberrations at the telephoto end of the zoom lens according to the second embodiment of the present disclosure.

FIG. 9 is a diagram illustrating a configuration example of the zoom lens according to a third embodiment of the present disclosure.

FIGS. 10A to 10C are diagrams illustrating the respective aberrations at the wide-angle end of the zoom lens according to the third embodiment of the present. disclosure.

FIGS. 11A to 11C are diagrams illustrating the respective aberrations at the intermediate focal length between the wide-angle end and the telephoto end of the zoom lens according to the third embodiment of the present disclosure.

DETAILED DESCRIPTION OF EMBODIMENTS

Figure 5:
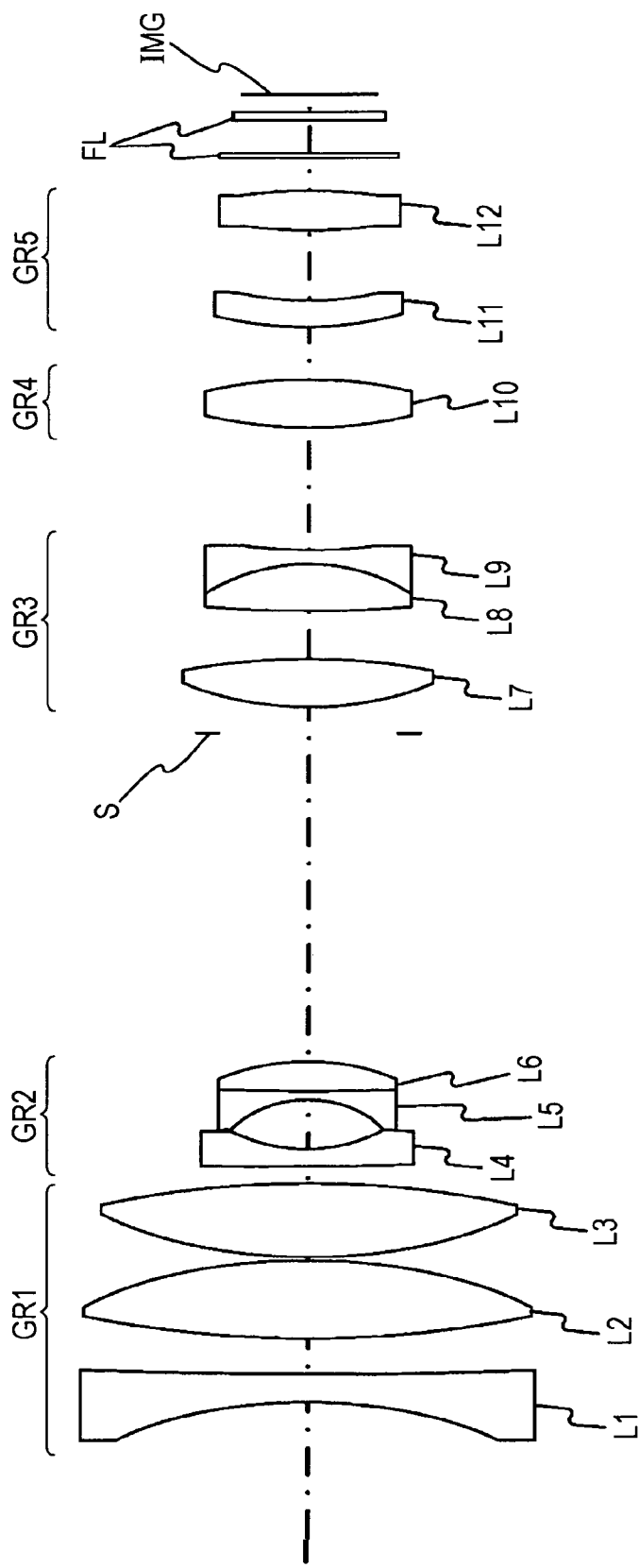
FIG. 5 is a diagram illustrating a configuration example of the zoom lens according to a second embodiment of the present disclosure.

A zoom lens according to an embodiment of the present disclosure is an inner focus type zoom lens including a first lens group GR1 that has positive refracting power and is normally located at a fixed position, a second lens group GR2 that has negative refracting power and is movable in an optical axis direction for zooming, a third lens group GR3 that has positive refracting power, a fourth lens group GR4 that is movable for correction of a focal position due to the zooming and for focusing, and a fifth lens group GR5 that has positive refracting power, in order from an object side, wherein the first lens group GR1 includes a negative lens L1, a first positive lens L2, and a second positive lens L3 arranged in order from the object side, wherein a first face of the negative lens L1 has a shape of a concave surface turned on the object side, and wherein the zoom lens satisfies the conditional equation (1) $-10.0<G1R1/fw<-3.0$, where G1R1 is a curvature radius of a lens surface closest to an object side, and fw is a focal length of the overall lens system at the wide-angle end. The zoom lens satisfies the conditional equation (1), and thereby it is possible to realize miniaturization of a front lens and a wide angle of a focal length at a telephoto end in a case where the first lens group GR1 has a three-lens configuration. In addition, the fifth lens group GR5 may be omitted.

The conditional equation (1) indicates a condition for giving a configuration appropriate to achieve the wide angle and the miniaturization of the front lens diameter to the first lens group GR1, and indicates strength of refracting power of the concave surface (the first face). It is possible to achieve the wide angle and the miniaturization of the front lens diameter by defining a curvature radius of the concave surface (the first face) turned on the object side. If a value is smaller than the lower limit of the conditional equation (1), power for raising light beams at the first face is notably weakened, which causes a large size of the front lens diameter. At this time, if the size is to be maintained, a desired wide angle is difficult to achieve. In addition, if a value is greater than the upper limit of the conditional expression (1), negative distortion and astigmatism are generated due to intense negative refracting power at the first face, which causes deterioration in performance.

In addition, the zoom lens according to the embodiment of the present disclosure preferably further satisfies the conditional equation (2) $-8.0<G1R1/fw<-5.0$, within the range of conditional equation (1).

Further, the zoom lens according to the embodiment of the present disclosure preferably further satisfies the conditional equation (3) $0.03<H1'/f1<0.3$, where H1' is a distance between a vertex of a face closest to an image side of the first lens group and a main point of the image side of the first lens group (the main point has the image side as a reference, and "−" indicates the object side and "+" indicates the image side), and f1 is a focal length of the first lens group.

The conditional equation (3) indicates a condition for giving a configuration appropriate to achieve the wide angle and the miniaturization of the front lens diameter to the first lens group GR1. It is possible to achieve the wide angle and the miniaturization of the front lens diameter by defining refracting power arrangements of the respective lenses such that the main point on the image side of the first lens group GR1 is generated on the image side to be sufficiently closer than a face closest to the image side of the first lens group GR1. If a value smaller than the lower limit of the conditional equation (3), the wide angle is difficult to achieve since a main point distance between the first lens group GR1 and the second lens group GR2 is lengthened. If a value is greater than the upper limit of the conditional equation (3), the height of the off-axis light flux passing through the first lens group GR1 is increased, which causes a large size of the front lens diameter.

In addition, it is more preferable to satisfy $0.07<H1'/f1<0.2$ in the conditional equation (3).

In addition, the zoom lens preferably according to the embodiment of the present disclosure further satisfies the conditional equation (4) $3.9<f1L/fw<5.9$, where f1L is a focal length of a lens closest to an image side of the first lens group GR1.

The conditional equation (4) defines refracting power of a lens closest to the image side of the first lens group GR1. If a value is greater than the upper limit of the conditional equation (4), the light beam height may not be sufficiently reduced in the first lens group GR1 formed by three lenses in the embodiment of the present disclosure, which causes a large size of the front group (GR1 and GR2) which is positioned on the object side when seen from the stop S. In addition, if a value is smaller than the lower limit of the conditional equation (4), curvature of a lens closest to the image side is increased, and thus aberration correction according to zooming is difficult.

In addition, it is more preferable to satisfy $4.2<f1L/fw<5.9$ in the conditional equation (4).

Further, in the zoom lens according to the embodiment of the present disclosure, at least one face in the first lens group GR1 is an aspherical surface, and, preferably, a lens L3 closest to the image side of the first lens group GR1 is an aspherical lens. The lens L3 closest to the image side of the first lens group GR1 is formed using an aspherical lens, and thereby it is possible to correct a spherical aberration at the telephoto end with good efficiency.

In the zoom lens according to the embodiment of the present disclosure, the fifth lens group fifth lens group GR5 includes a front group L11 having negative refracting power and a rear group L12 having positive refracting power, and any one of the front group L11 and the rear group L12 is moved in a direction perpendicular to the optical axis, and thereby an image formed on an image surface is also moved in the direction perpendicular to the optical axis. Thereby, image blurring due to shake is corrected by moving the movable group in the fifth lens group GR5 in a direction which is substantially perpendicular to the optical axis. The movable group closest to the image side in the fifth lens group GR5 is set to a movable lens group for anti-shake, and thereby it is possible to prevent a large size of a lens barrel since an effective diameter of the light flux is a relatively small part. In addition, an influence on variations in light flux positions in other lens groups is small, and thus it is possible to prevent a large size of the lens barrel. Furthermore, a limitation on securement of spaces before and after the movable lens is also small, and thus it is possible to improve optical performance and miniaturize a lens barrel.

Hereinafter, embodiments of the present disclosure will be described. The description will be made in the following order.

1. FIRST EMBODIMENT (NUMERICAL VALUE EXAMPLE 1)
2. SECOND EMBODIMENT (NUMERICAL VALUE EXAMPLE 2)
3. THIRD EMBODIMENT (NUMERICAL VALUE EXAMPLE 3)
4. APPLICATION EXAMPLE (IMAGE CAPTURING APPARATUS)

In addition, meanings or the like of signs shown in the following Tables or description are as follows. That is to say, a "face number" denotes an i-th face when counted from an object side, "Ri" denotes a curvature radius of the i-th face, "Di" denotes an axial surface interval (lens center thickness or air space) between the i-th face and the (i+1)-th face when counted from the object side. "Ni" denotes a right eye image in the d ray (wavelength 587.6 nm) of a material forming the i-th lens, "vi" denotes Abbe's number in the d ray (wavelength 587.6 nm) of a material forming the i-th lens, "f" denotes a focal length of the overall lens system, "Fno" denotes a maximum aperture, and "ω" denotes a half angle of view. In addition, "∞" denotes that a corresponding face is a plane, and "ASP" denotes that a corresponding face is an aspherical surface. In addition, a variable interval of the axial surface intervals "Di" is denoted with "variable".

In addition, there are cases where a lens surface is aspherical in the zoom lens used in the respective embodiments. If a distance from the vertex of a lens surface in the optical axis direction is "x", a height in a direction perpendicular to the optical axis is "y", a paraxial curvature at the lens vertex is "c", and a conical constant is "κ", x is defined by $x = cy^2/(1+(1-(1+\kappa)c^2y^2)^{1/2}) + A2y^2 + A4y^4 + A6y^6 + A8y^8 + A10y^{10}$. Here, A2, A4, A6, A8, and A10 are respectively 2nd order, 4th order, 6th order, 8th order, and 10th order aspherical coefficients.

1. First Embodiment

Configuration of Zoom Lens

FIG. 1 is a diagram illustrating a configuration example according to a first embodiment of the present disclosure. The zoom lens according to the first embodiment includes a first lens group GR1, a second lens group GR2, a third lens group GR3, a fourth lens group GR4, and a fifth lens group GR5, arranged in order from an object side. The first lens group GR1 has positive refracting power, the second lens group GR2 has negative refracting power, the third lens group GR3 has positive refracting power, the fourth lens group GR4 has positive refracting power, and the fifth lens group GR5 has positive refracting power.

The first lens group GR1 includes three lenses, a cemented lens array of a negative lens L1 having a strong concave surface turned on the object side and a positive lens L2, and a positive lens L3 in order from the object side. The lens L3 is formed of an aspherical lens.

The second lens group GR2 includes three lenses, a negative lens L4 having a strong concave surface turned on an image side, and a cemented lens array of a biconcave lens L5 and a positive lens L6 in order from the object side. The lens L4 has both surfaces which are aspherical.

The third lens group GR3 includes two lenses, a positive lens L7 and a negative lens L8 in order from the object side. The lens L7 has both surfaces which are aspherical.

The fourth lens group GR4 includes a cemented lens array of a positive lens L9 and a negative lens L10. The surface on the object side of the positive lens L9 is aspherical.

The fifth lens group GR5 includes a movable group which is formed by a lens L11 having negative refracting power and is movable in the direction perpendicular to the optical axis, and a fixed group which is formed by a lens L12 having positive refracting power and is normally located at a fixed position. In addition, the lens L12 has both surfaces which are aspherical.

Further, a stop S is disposed between the second lens group GR2 and the third lens group GR3, and a filter FL is disposed between the fifth lens group GR5 and an image surface IMG.

Data of Zoom Lens

Table 1 shows lens data of a numerical value example 1 where detailed numerical values are applied to the zoom lens according to the first embodiment.

TABLE 1

| SURFACE NUMBER | R | D | N | ν |
|---|---|---|---|---|
| 1 | −6.673 | 0.274 | 1.904 | 31.3 |
| 2 | 10.319 | 1.630 | 1.603 | 60.7 |
| 3 | −6.555 | 0.046 | | |
| 4(ASP) | 5.800 | 1.027 | 1.729 | 54.0 |
| 5(ASP) | −9.912 | 0.152 | | |
| 6(ASP) | 8.148 | 0.183 | 1.851 | 40.1 |
| 7(ASP) | 1.591 | 0.506 | | |
| 8 | −1.623 | 0.131 | 1.835 | 42.7 |
| 9 | 4.587 | 0.369 | 1.946 | 18.0 |
| 10 | −5.043 | 4.219 | | |
| STOP | INFINITY | 0.396 | | |
| 12(ASP) | 2.200 | 0.903 | 1.623 | 58.2 |
| 13(ASP) | −3.617 | 0.312 | | |
| 14 | −67.694 | 0.183 | 1.806 | 33.3 |
| 15 | 2.535 | 1.335 | | |
| 16(ASP) | 2.548 | 0.989 | 1.553 | 71.7 |
| 17 | −2.071 | 0.183 | 1.923 | 20.9 |
| 18 | −2.917 | 0.458 | | |
| 19 | 4.797 | 0.168 | 1.773 | 49.6 |
| 20 | 1.827 | 1.229 | | |
| 21(ASP) | 4.419 | 0.485 | 1.553 | 71.7 |
| 22(ASP) | −2.957 | 0.125 | | |
| 23 | INFINITY | 0.030 | 1.517 | 64.2 |
| 24 | INFINITY | 0.387 | | 0.0 |
| 25 | INFINITY | 0.152 | 1.517 | 64.2 |
| 26 | INFINITY | 0.162 | | |
| IMG | INFINITY | 0.000 | | |

In the zoom lens according to the first embodiment, the 4th face, the 5th face, the 6th face, the 7th face, the 12th face, the 13th face, the 16th face, the 21st face, and the 22nd face have the aspherical shape as described above. Table 2 shows the conical constant κ, and the 4th order, 6th order, 8th order, and 10th order aspherical coefficients A4, A6, A8 and A10 of the respective faces.

TABLE 2

| SURFACE NUMBER | κ | A4 | A6 | A8 | A10 |
|---|---|---|---|---|---|
| 4(ASP) | 0 | −4.617E−04 | 2.286E−05 | 0.000E+00 | 0.000E+00 |
| 5(ASP) | 0 | 1.191E−03 | 0.000E+00 | 0.000E+00 | 0.000E+00 |
| 6(ASP) | 0 | −2.187E−02 | 3.988E−02 | −8.520E−03 | 0.000E+00 |
| 7(ASP) | 0 | −3.725E−02 | 3.902E−02 | 3.902E−02 | 0.000E+00 |
| 12(ASP) | 0 | −1.399E−02 | −1.271E−03 | −1.601E−04 | 0.000E+00 |
| 13(ASP) | 0 | 1.381E−02 | −3.701E−04 | 0.000E+00 | 0.000E+00 |
| 16(ASP) | 0 | −1.64E−02 | −4.523E−04 | −3.792E−04 | 0.000E+00 |
| 21(ASP) | 0 | −4.330E−02 | 2.215E−02 | −9.671E−02 | 6.591E−02 |
| 22(ASP) | 0 | 5.293E−02 | −4.996E−02 | −1.753E−02 | 3.454E−02 |

In the first embodiment, when a lens position is varied from the wide-angle end to the telephoto end, distances between the respective lens groups are varied. That is to say, there are variations of a distance D5 between the first lens group GR1 and the second lens group GR2, a distance D10 between the second lens group GR2 and the stop, a distance D15 between the third lens group GR3 and the fourth lens group GR4, and a distance D18 between the fourth lens group GR4 and the fifth lens group GR5. The respective numerical values of the distances D5, D10, D15 and D18, the focal length f, the maximum aperture Fno, and the half angle of view ω at the wide-angle end (f=1.0), the intermediate focal length (f=2.92), and the telephoto end (f=8.5) are shown in Table 3.

TABLE 3

| f | 1.000 | 2.918 | 8.500 |
|---|---|---|---|
| Fno. | 1.850 | 2.621 | 3.500 |
| ω | 36.190 | 12.529 | 4.307 |
| D5 | 0.152 | 2.455 | 3.977 |
| D10 | 4.219 | 1.916 | 0.394 |
| D15 | 1.335 | 0.624 | 0.565 |
| D18 | 0.458 | 1.169 | 1.227 |

Aberration of Zoom Lens

FIGS. 2A to 4C show the respective aberrations of the zoom lens according to the first embodiment of the present disclosure. FIG. 2A to 2C show the respective aberrations at the wide-angle end of the zoom lens according to the first embodiment of the present disclosure. FIGS. 3A to 3C show the respective aberrations at the intermediate focal length between the wide-angle end and the telephoto end of the zoom lens according to the first embodiment of the present disclosure. FIGS. 4A to 4C show the respective aberrations at the telephoto end of the zoom lens according to the first embodiment of the present disclosure. In the respective figures, A shows a spherical aberration, B shows astigmatism, and C shows a distortion aberration.

In addition, in the spherical aberration diagram, the solid line denotes a value at a d ray (wavelength 587.56 nm), the broken line denotes a value at a C ray (wavelength 656.3 nm), and the chain line denotes a value at a g ray (wavelength 435.8 nm). In addition, in the astigmatism diagram, the solid line DS denotes a value at a sagittal image surface, and the broken line DM denotes a value at a meridional image surface.

2. Second Embodiment

Configuration of Zoom Lens

FIG. 5 is a diagram illustrating a configuration example according to a second embodiment of the present disclosure. The zoom lens according to the second embodiment includes, in the same manner as the first embodiment, a first lens group GR1, a second lens group GR2, a third lens group GR3, a fourth lens group GR4, and a fifth lens group GR5, arranged in order from an object side. In addition, in the same manner as the first embodiment, the first lens group GR1 has positive refracting power, the second lens group GR2 has negative refracting power, the third lens group GR3 has positive refracting power, the fourth lens group GR4 has positive refracting power, and the fifth lens group GR5 has positive refracting power.

The first lens group GR1 includes three lenses, a negative lens L1 having a strong concave surface turned on the object side, a positive lens L2, and a positive lens L3 in order from the object side. The lens L3 is formed of an aspherical lens.

The second lens group GR2 includes three lenses, a negative lens L4 having a strong concave surface turned on an image side, and a cemented lens array of a biconcave lens L5 and a positive lens L6 in order from the object side. The lens L4 has both surfaces which are aspherical.

The third lens group GR3 includes three lenses, a positive lens L7, and a cemented lens array of a positive lens L8 and a negative lens L9 in order from the object side. The lens L7 has both surfaces which are aspherical.

The fourth lens group GR4 includes only one positive lens L10. The lens L10 has both surfaces which are aspherical.

The fifth lens group GR5 includes a movable group which is formed by a lens L11 having negative refracting power and is movable in the direction perpendicular to the optical axis, and a fixed group which is formed by a lens L12 having positive refracting power and is normally located at a fixed position. In addition, the lens L11 and the lens L12 have both surfaces which are aspherical.

Further, a stop S is disposed between the second lens group GR2 and the third lens group GR3, and a filter FL is disposed between the fifth lens group GR5 and an image surface IMG.

Data of Zoom Lens

Table 4 shows lens data of a numerical value example 2 where detailed numerical values are applied to the zoom lens according to the second embodiment.

TABLE 4

| SURFACE NUMBER | R | D | N | ν |
|---|---|---|---|---|
| 1 | −6.431 | 0.356 | 2.001 | 29.1 |
| 2 | 58.079 | 0.477 | | |
| 3 | 15.293 | 0.949 | 1.497 | 81.6 |
| 4 | −6.121 | 0.044 | | |
| 5(ASP) | 5.920 | 0.890 | 1.729 | 54.0 |
| 6(ASP) | −10.488 | 0.222 | | |
| 7(ASP) | −11.866 | 0.178 | 1.851 | 40.1 |
| 8(ASP) | 1.941 | 0.613 | | |
| 9 | −1.475 | 0.148 | 1.835 | 42.7 |
| 10 | 37.706 | 0.350 | 1.946 | 18.0 |
| 11 | −2.902 | 4.059 | | |
| STOP | INFINITY | 0.297 | | |
| 13(ASP) | 3.802 | 0.613 | 1.851 | 40.1 |

TABLE 4-continued

| SURFACE NUMBER | R | D | N | ν |
|---|---|---|---|---|
| 14(ASP) | −6.598 | 0.562 | | |
| 15 | 6.321 | 0.606 | 1.497 | 81.6 |
| 16 | −2.246 | 0.178 | 2.001 | 25.5 |
| 17 | 7.969 | 1.532 | | |
| 18(ASP) | 3.348 | 0.623 | 1.553 | 71.7 |
| 19(ASP) | −3.276 | 0.626 | | |
| 20 | 6.645 | 0.297 | 1.773 | 49.6 |
| 21 | 2.381 | 0.854 | | |
| 22(ASP) | −15.528 | 0.534 | 1.553 | 71.7 |
| 23(ASP) | −13.319 | 0.403 | | |
| 24 | INFINITY | 0.030 | 1.517 | 64.2 |
| 25 | INFINITY | 0.377 | | |
| 26 | INFINITY | 0.148 | 1.517 | 64.2 |
| 27 | INFINITY | 0.157 | | |
| IMG | INFINITY | 0.000 | | |

In addition, the 5th face, the 6th face, the 7th face, the 8th face, the 13th face, the 14th face, the 18th face, the 19th face, the 22nd face, and the 23rd face have the aspherical shape as described above. Table 5 shows the conical constant κ, and the 2nd order, 4th order, 6th order, 8th order, and 10th order aspherical coefficients A2, A4, A6, A8 and A10 of the respective faces.

TABLE 5

| SURFACE NUMBER | κ | A2 | A4 | A6 | A8 | A10 |
|---|---|---|---|---|---|---|
| 5(ASP) | 0.000 | 0.000 | −2.296E−04 | 1.992E−05 | −1.702E−06 | 0.000E+00 |
| 6(ASP) | 0.000 | 0.000 | 1.878E−03 | −3.248E−05 | −6.746E−07 | 0.000E+00 |
| 7(ASP) | 0.000 | 0.000 | 3.684E−02 | −4.107E−05 | −1.109E−03 | 0.000E+00 |
| 8(ASP) | 0.000 | 0.000 | 1.735E−02 | 2.093E−02 | 0.000E+00 | 0.000E+00 |
| 13(ASP) | 0.000 | 0.000 | −1.764E−03 | 2.095E−04 | −5.813E−05 | 0.000E+00 |
| 14(ASP) | 0.000 | 0.000 | 6.541E−04 | 0.000E+00 | 0.000E+00 | 0.000E+00 |
| 18(ASP) | 0.000 | 0.000 | −1.015E−02 | −3.718E−03 | 2.535E−04 | −1.674E−04 |
| 19(ASP) | 0.000 | 0.000 | 6.598E−03 | −5.286E−03 | 4.073E−04 | 0.000E+00 |
| 22(ASP) | 0.000 | 1.345E−01 | 1.116E−02 | 0.000E+00 | 0.000E+00 | 0.000E+00 |
| 23(ASP) | 0.000 | −1.307E−01 | 7.661E−02 | 0.000E+00 | 0.000E+00 | 0.000E+00 |

In the second embodiment, when a lens position is varied from the wide-angle end to the telephoto end, distances between the respective lens groups are varied. That is to say, there are variations of a distance D5 between the first lens group GR1 and the second lens group GR2, a distance D10 between the second lens group GR2 and the stop S, a distance D15 between the third lens group GR3 and the fourth lens group GR4, and a distance D18 between the fourth lens group GR4 and the fifth lens group GR5. The respective numerical values of the distances D5, D10, D15 and D18, the focal length f, the maximum aperture Fno, and the half angle of view ω at the wide-angle end (f=1.0), the intermediate focal length (f=2.89), and the telephoto end (f=8.34) are shown in Table 6.

TABLE 6

| f | 1.000 | 2.893 | 8.335 |
|---|---|---|---|
| Fno. | 1.850 | 2.703 | 3.500 |
| ω | 35.500 | 12.406 | 4.250 |
| D6 | 0.222 | 2.415 | 3.941 |
| D11 | 4.059 | 1.867 | 0.341 |
| D17 | 1.532 | 0.702 | 1.037 |
| D19 | 0.626 | 1.456 | 1.121 |

Aberration of Zoom Lens

FIGS. 6A to 8C show the respective aberrations of the zoom lens according to the second embodiment of the present disclosure. FIG. 6A to 6C show the respective aberrations at the wide-angle end of the zoom lens according to the second embodiment of the present disclosure. FIGS. 7A to 7C show the respective aberrations at the intermediate focal length between the wide-angle end and the telephoto end of the zoom lens according to the second embodiment of the present disclosure. FIGS. 8A to 8C show the respective aberrations at the telephoto end of the zoom lens according to the second embodiment of the present disclosure. In the respective figures, A shows a spherical aberration, B shows astigmatism, and C shows a distortion aberration. In addition, the kinds of lines in the respective aberration diagrams are the same as those described in the first embodiment.

3. Third Embodiment

Configuration of Zoom Lens

FIG. 9 is a diagram illustrating a configuration example according to a third embodiment of the present disclosure. The zoom lens according to the third embodiment includes, in the same manner as the first embodiment, a first lens group GR1, a second lens group GR2, a third lens group GR3, a fourth lens group GR4, and a fifth lens group GR5, arranged in order from an object side. In addition, in the same manner as the first embodiment, the first lens group GR1 has positive refracting power, the second lens group GR2 has negative refracting power, the third lens group GR3 has positive refracting power, the fourth lens group GR4 has positive refracting power, and the fifth lens group GR5 has positive refracting power.

The first lens group GR1 includes three lenses, a cemented lens array of a negative lens L1 having a strong concave surface turned on the object side and a positive lens L2, and a positive lens L3 in order from the object side. The lens L3 is formed of an aspherical lens.

The second lens group GR2 includes three lenses, a negative lens L4 having a strong concave surface turned on an image side, and a cemented lens array of a biconcave lens L5 and a positive lens L6 in order from the object side. The lens L4 has both surfaces which are aspherical.

The third lens group GR3 includes three lenses, a positive lens L7, a positive lens L8, and a negative lens L9 in order from the object side. The lens L7 has both surfaces which are aspherical.

The fourth lens group GR4 includes only one positive lens L10. The lens L10 has both surfaces which are aspherical.

The fifth lens group GR5 includes a movable group which is formed by a lens L11 having negative refracting power and is movable in the direction perpendicular to the optical axis, and a fixed group which is formed by a lens L12 having positive refracting power and is normally located at a fixed position. In addition, the lens L11 and the lens L12 have both surfaces which are aspherical.

Further, a stop S is disposed between the second lens group GR2 and the third lens group GR3, and a filter FL is disposed between the fifth lens group GR5 and an image surface IMG.

Data of Zoom Lens

Table 7 shows lens data of a numerical value example 3 where detailed numerical values are applied to the zoom lens according to the third embodiment.

TABLE 7

| SURFACE NUMBER | R | D | N | ν |
|---|---|---|---|---|
| 1 | −5.883 | 0.297 | 2.001 | 29.1 |
| 2 | −522.824 | 0.951 | 1.497 | 81.6 |
| 3 | −5.639 | 0.189 | | |
| 4(ASP) | 5.798 | 1.024 | 1.729 | 54.0 |
| 5(ASP) | −7.782 | 0.223 | | |
| 6(ASP) | −14.855 | 0.178 | 1.851 | 40.1 |
| 7(ASP) | 1.834 | 0.504 | | |
| 8 | −1.510 | 0.149 | 1.835 | 42.7 |
| 9 | 15.101 | 0.372 | 1.946 | 18.0 |
| 10 | −3.048 | 4.083 | | |
| STOP | INFINITY | 0.297 | | |
| 12(ASP) | 4.072 | 0.612 | 1.851 | 40.1 |
| 13(ASP) | −5.859 | 0.534 | | |
| 14 | 7.559 | 0.562 | 1.497 | 81.6 |
| 15 | −2.424 | 0.178 | 2.001 | 25.5 |
| 16 | 7.976 | 1.668 | | |
| 17(ASP) | 3.535 | 0.606 | 1.553 | 71.7 |
| 18(ASP) | −3.430 | 0.471 | | |
| 19(ASP) | 3.699 | 0.297 | 1.773 | 49.2 |
| 20(ASP) | 1.877 | 1.124 | | |
| 21(ASP) | 7.311 | 0.654 | 1.553 | 71.7 |
| 22(ASP) | −4.696 | 0.416 | | |
| 23 | INFINITY | 0.030 | 1.517 | 64.2 |
| 24 | INFINITY | 0.377 | | |
| 25 | INFINITY | 0.149 | 1.517 | 64.2 |
| 26 | INFINITY | 0.157 | | |
| IMG | INFINITY | 0.000 | | |

In addition, the 4th face, the 5th face, the 6th face, the 7th face, the 12th face, the 13th face, the 17th face, the 18th face, the 19th face, the 20th face, the 21st face, and the 22nd face have the aspherical shape as described above. Table 8 shows the conical constant κ, and the 2th order, 4th order, 6th order, 8th order, and 10th order aspherical coefficients A2, A4, A6, A8 and A10 of the respective faces.

TABLE 8

| SURFACE NUMBER | κ | A2 | A4 | A6 | A8 | A10 |
|---|---|---|---|---|---|---|
| 4(ASP) | 0.000 | 0.000 | −4.390E−04 | 1.992E−05 | 1.373E−06 | 0.000E+00 |
| 5(ASP) | 0.000 | 0.000 | 2.036E−03 | −7.779E−05 | 3.915E−06 | 0.000E+00 |
| 6(ASP) | 0.000 | 0.000 | 1.497E−02 | 1.740E−02 | −6.664E−03 | 0.000E+00 |
| 7(ASP) | 0.000 | 0.000 | −7.136E−03 | 3.376E−02 | 0.000E+00 | 0.000E+00 |
| 12(ASP) | 0.000 | 0.000 | −2.979E−03 | 8.539E−05 | −4.577E−05 | 0.000E+00 |
| 13(ASP) | 0.000 | 0.000 | 5.233E−05 | 0.000E+00 | 0.000E+00 | 0.000E+00 |
| 17(ASP) | 0.000 | 0.000 | −1.118E−02 | 8.463E−04 | −1.810E−03 | −5.302E−04 |
| 18(ASP) | 0.000 | 0.000 | 2.948E−03 | −6.474E−04 | −2.124E−03 | 0.000E+00 |
| 19(ASP) | 0.000 | 0.000 | −2.717E−02 | −2.025E−02 | 1.634E−02 | 0.000E+00 |
| 20(ASP) | 0.000 | 0.000 | −3.852E−02 | −3.813E−02 | 2.787E−02 | 0.000E+00 |
| 21(ASP) | 0.000 | 7.491E−02 | 1.423E−02 | 0.000E+00 | 0.000E+00 | 0.000E+00 |
| 22(ASP) | 0.000 | −4.901E−02 | 7.626E−02 | 0.000E+00 | 0.000E+00 | 0.000E+00 |

In the third embodiment, when a lens position is varied from the wide-angle end to the telephoto end, distances between the respective lens groups are varied. That is to say, there are variations of a distance D5 between the first lens group GR1 and the second lens group GR2, a distance D10 between the second lens group GR2 and the stop S, a distance D15 between the third lens group GR3 and the fourth lens group GR4, and a distance D18 between the fourth lens group GR4 and the fifth lens group GR5. The respective numerical values of the distances D5, D10, D15 and D18, the focal length f, the maximum aperture Fno, and the half angle of view ω at the wide-angle end (f=1.0), the intermediate focal length (f=2.90), and the telephoto end (f=8.34) are shown in Table 9.

TABLE 9

| f | 1.000 | 2.895 | 8.348 |
|---|---|---|---|
| Fno. | 1.850 | 2.580 | 3.500 |
| ω | 35.504 | 12.372 | 4.253 |
| D5 | 0.223 | 2.417 | 3.964 |
| D10 | 4.083 | 1.888 | 0.342 |
| D16 | 1.668 | 0.744 | 0.929 |
| D18 | 0.471 | 1.395 | 1.211 |

Aberration of Zoom Lens

Figure 12A:
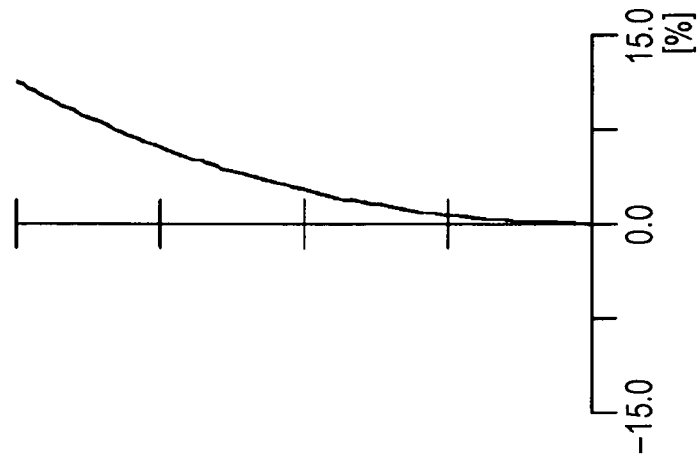
FIGS. 12A to 12C are diagrams illustrating the respective aberrations at the telephoto end of the zoom lens according to the third embodiment of the present disclosure.
Figure 12B:
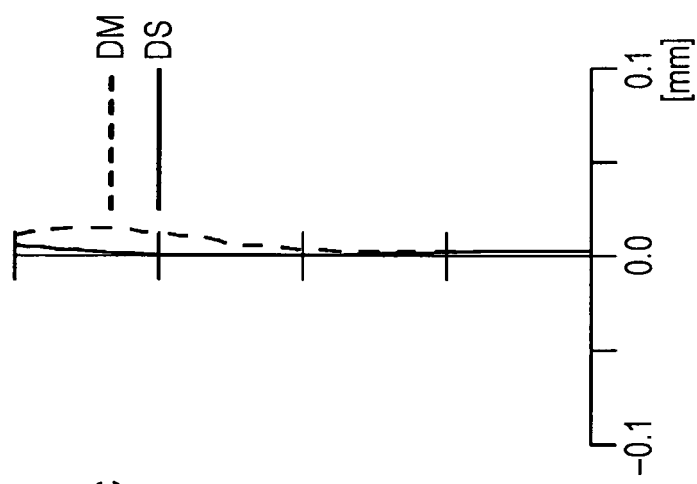
Figure 12C:
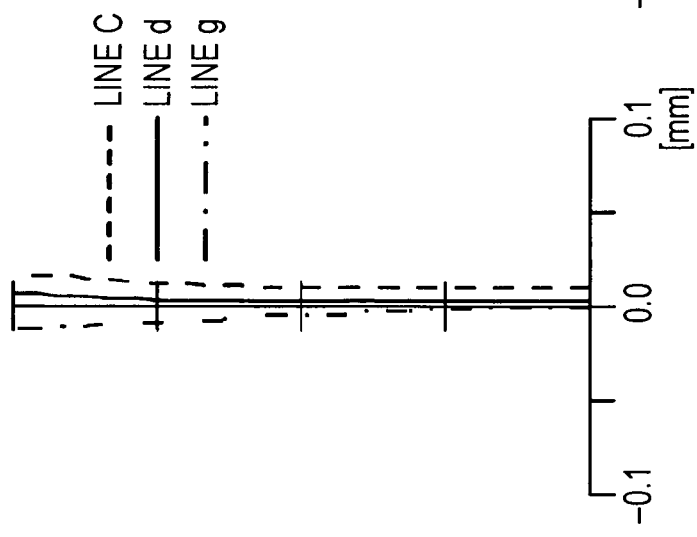

FIGS. 10A to 12C show the respective aberrations of the zoom lens according to the third embodiment of the present disclosure. FIG. 10A to 10C show the respective aberrations at the wide-angle end of the zoom lens according to the third embodiment of the present disclosure. FIGS. 11A to 11C show the respective aberrations at the intermediate focal length between the wide-angle end and the telephoto end of the zoom lens according to the third embodiment of the present disclosure. FIGS. 12A to 12C show the respective aberrations at the telephoto end of the zoom lens according to the third embodiment of the present disclosure. In the respective figures, A shows a spherical aberration, B shows astigmatism, and C shows a distortion aberration. In addition, the kinds of lines in the respective aberration diagrams are the same as those described in the first embodiment.

Collection of Conditional Equations

Table 10 shows the respective values in the numerical value examples 1 to 3 according to the first to third embodiments. As is clear from the values, it can be seen that the conditional equations (1) to (4) are satisfied. As shown in the respective aberration diagrams, it can be seen that the respective aberrations are corrected in a balanced manner at the wide-angle end, the intermediate focal length position between the wide-angle end and the telephoto end, and the telephoto end.

TABLE 10

|  | NUMERICAL VALUE EXAMPLE 1 | NUMERICAL VALUE EXAMPLE 2 | NUMERICAL VALUE EXAMPLE 3 |
|---|---|---|---|
| fw | 1.00 | 1.00 | 1.00 |
| G1R1 | −6.67 | −6.43 | −5.88 |
| H1' | 0.76 | 0.77 | 0.58 |
| f1 | 5.64 | 5.34 | 5.61 |
| f1L | 5.16 | 5.31 | 4.69 |
| G1R1/fw | −6.67 | −6.43 | −5.88 |
| H1'/f1 | 0.13 | 0.14 | 0.10 |
| f1L/fw | 5.16 | 5.31 | 4.69 |

4. Application Example

Configuration of Image Capturing Apparatus

Figure 13:
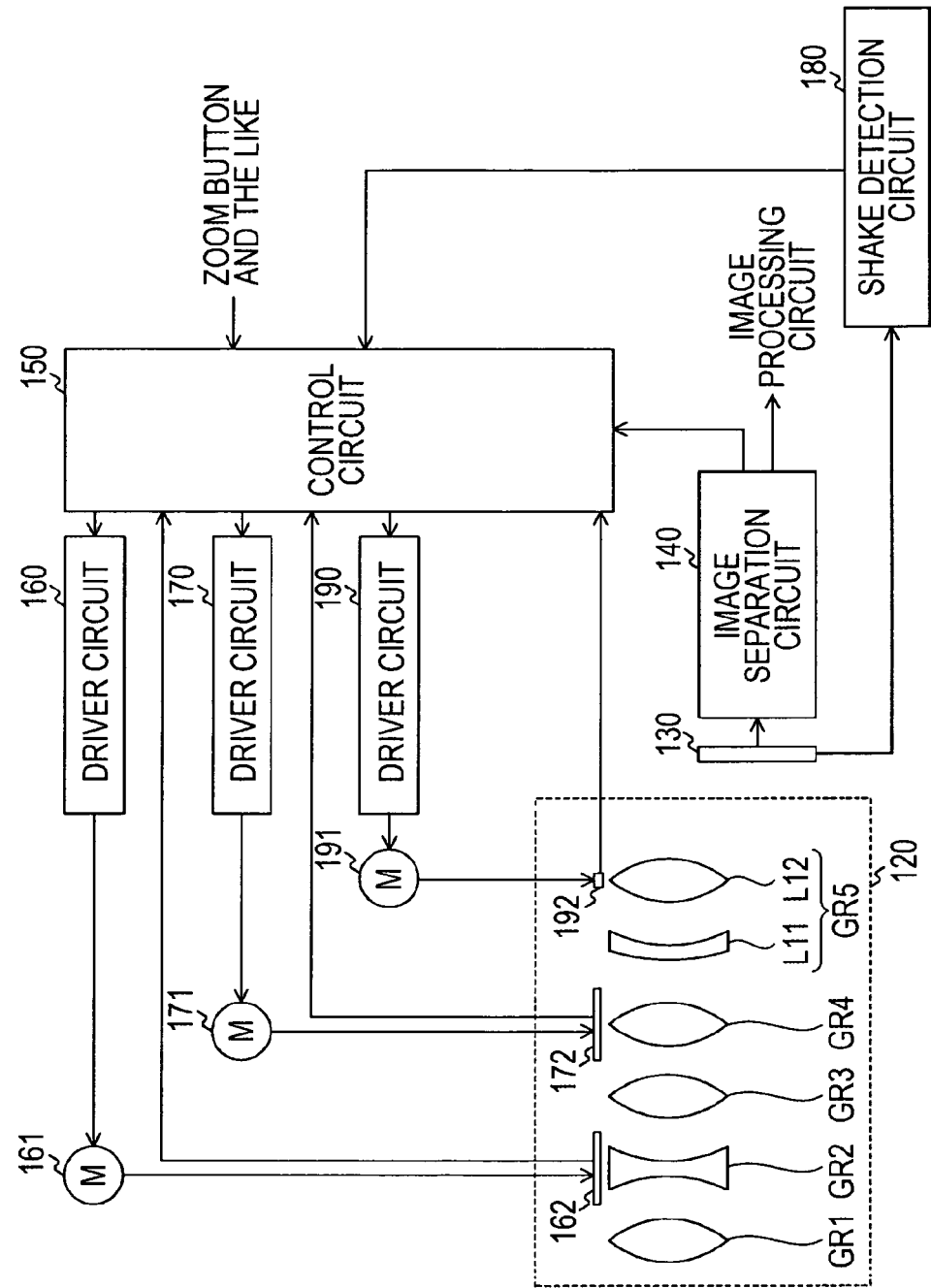
FIG. 13 is a diagram illustrating an example where the zoom lens according to the first to third embodiment is applied to an image capturing apparatus.

FIG. 13 is a diagram illustrating an example where the zoom lens according to the first to third embodiments of the present disclosure is applied to an image capturing apparatus 100. The image capturing apparatus 100 includes the zoom lens 120 according to the first to third embodiments, and an imaging device 130 which converts an optical image formed by the zoom lens 120 into an electric signal. The imaging device 130 may use a photoelectric conversion element, such as, a CCD (Charge Coupled Device) or a CMOS (Complementary Metal-Oxide Semiconductor). The zoom lens 120 briefly shows the lens groups according to the first to third embodiments as a single lens.

The electric signal generated by the imaging device 130 is supplied to a control circuit 150 as a signal for focus control by an image separation circuit 140, and is supplied to an image processing circuit of a rear stage (not shown) as a signal for an image. The signal sent to the image processing circuit is processed to be suitable for subsequent processes, and is used for processes such as display, recording, and transmission.

When an operation signal is input from an external device such as, for example, an operation of a zoom button, the control circuit 150 performs various processes in response to the operation signal. For example, when a zooming instruction is input using the zoom button, the control circuit 150 moves the respective lens groups GR2 and GR4 by operating driving units 161 and 171 via driver circuits 160 and 170 in order to enter a focal length state in response to the instruction. Positional information of the respective lens groups GR2 and GR4 obtained by the respective sensors 162 and 172 is input to the control circuit 150, and is referred to when an instruction signal is output to the driver circuits 160 and 170. In addition, the control circuit 150 checks a focus state based on a signal sent from the image separation circuit 140, and controls a position of the fourth lens group GR4 via the driver circuit 170 and the driving unit 171 in order to obtain an optimal focus state.

The image capturing apparatus 100 has an anti-shake function. For example, a shake detection circuit 180 detects a shake in the imaging device 130 according to the pressing of a shutter release button. The shake detection circuit 180 is implemented by, for example, a gyro sensor. When a signal from the shake detection circuit 180 is input to the control circuit 150, the control circuit 150 calculates a blurring correction angle for compensating image blurring. The control circuit 150 operates the driving unit 191 via the driver circuit 190 and shifts the lens L12 of the fifth lens group GR5 in the direction perpendicular to the optical axis based on the calculated blurring correction angle. The position of the lens L12 of the fifth lens group GR5 is detected by the sensor 192, and positional information of the lens L12 obtained by the sensor 192 is input to the control circuit 150 and is referred to when an instruction signal is transmitted to the driver circuit 190.

Here, an example where a position of the lens L12 on the image side of the fifth lens group GR5 is moved has been described. Generally, a high dispersion glass material is used for the lens L11 of the fifth lens group GR5, and a low dispersion glass material is used for the lens L12 thereof. Since deterioration due to chromatic aberration occurs in a case of moving the lens for anti-shake, it is possible to suppress occurrence of chromatic aberration through the movement of the lens L12 using the low dispersion glass material if possible. However, the lens L11 may be moved.

In addition, in a case where the anti-shake function is not necessary, the fifth lens group GR5 may be omitted. Therefore, in this case, the zoom lens is formed by the first lens group to the fourth lens group.

Detailed products to which the image capturing apparatus 100 is applied may employ various kinds of forms. For example, the image capturing apparatus may be widely applied as a camera portion or the like of a digital input and output apparatus such as a digital still camera, a digital video camera, a camera-embedded mobile phone, or a camera-embedded PDA (Personal Digital Assistant).

As such, according to the embodiments of the present disclosure, in the zoom lens having a high zoom ratio and the optical anti-shake mechanism, it is possible to make the first lens group to include three lenses, and to achieve a wide angle of view where a half angle of view is 36 degrees and miniaturization of a front lens diameter.

In addition, the embodiments of the present disclosure show an example for implementing the present disclosure, and the matters in the embodiments of the present disclosure respectively have correspondence relationships with the matters which specify the disclosure in the claims, as clearly described in the embodiments of the present disclosure. In the same manner, the matters which specify the disclosure in the claims respectively have correspondence relationships with the matters in the embodiments of the present disclosure. However, the present disclosure is not limited to the embodiments, and may be implemented through various modifications of the embodiments in the scope not departing from the spirit of the present disclosure.

The present disclosure contains subject matter related to that disclosed in Japanese Priority Patent Application JP 2010-272131 filed in the Japan Patent Office on Dec. 7, 2010, the entire contents of which are hereby incorporated by reference.

What is claimed is:

1. An inner focus type zoom lens comprising:
a first lens group that has positive refracting power and is normally located at a fixed position, a second lens group that has negative refracting power and is movable in an optical axis direction for zooming, a third lens group that has positive refracting power, a fourth lens group that is movable for correction of a focal position due to the zooming and for focusing, and a fifth lens group that has positive refracting power, in order from an object side,
wherein the first lens group includes a negative lens, a first positive lens, and a second positive lens arranged in order from the object side,
wherein a first face of the negative lens has a shape of a concave surface turned on the object side, and
wherein the zoom lens satisfies the following conditional equation (1):
(1) $-10.0 < G1R1/fw < -3.0$, where G1R1 is a curvature radius of a lens surface closest to the object side, and fw is a focal length of the overall lens system at the wide-angle end.

2. The zoom lens according to claim 1, further satisfying the following conditional equation (2):

$$-8.0 < G1R1/fw < -5.0 \qquad (2).$$

3. The zoom lens according to claim 1, further satisfying the following conditional equation (3):
(3) $0.03 < H1'/f1 < 0.3$, where H1' is a distance between a vertex of a face closest to an image side of the first lens group and a main point of the image side of the first lens group, and f1 is a focal length of the first lens group.

4. The zoom lens according to claim 1, further satisfying the following conditional equation (4):
(4) $3.9 < f1L/fw < 5.9$, where f1L is a focal length of a lens closest to an image side of the first lens group.

5. The zoom lens according to claim 1, wherein at least one face in the first lens group is an aspherical surface.

6. The zoom lens according to claim 5, wherein a lens closest to the image side of the first lens group is an aspherical lens.

7. The zoom lens according to claim 1, wherein the fifth lens group includes a front group having negative refracting power and a rear group having positive refracting power in order from the object side, and
wherein any one of the front group and the rear group is moved in a direction perpendicular to the optical axis, and thereby an image formed on an image surface is also moved in the direction perpendicular to the optical axis.

8. An inner focus type zoom lens comprising:
a first lens group that has positive refracting power and is normally located at a fixed position, a second lens group that has negative refracting power and is movable in an optical axis direction for zooming, a third lens group that has positive refracting power, and a fourth lens group that is movable for correction of a focal position due to the zooming and for focusing, in order from an object side,
wherein the first lens group includes a negative lens, a first positive lens, and a second positive lens arranged in order from the object side,
wherein a first face of the negative lens has a shape of a concave surface turned on the object side, and
wherein the zoom lens satisfies the following conditional equation (1):
(1) $-10.0 < G1R1/fw < -3.0$, where G1R1 is a curvature radius of a lens surface closest to the object side, and fw is a focal length of the overall lens system at the wide-angle end.

9. The zoom lens according to claim 8, further satisfying the following conditional equation (2):

$$-8.0 < G1R1/fw < -5.0 \qquad (2).$$

10. The zoom lens according to claim 8, further satisfying the following conditional equation (3):
(3) $0.03 < H1'/f1 < 0.3$, where H1' is a distance between a vertex of a face closest to an image side of the first lens group and a main point of the image side of the first lens group, and f1 is a focal length of the first lens group.

11. The zoom lens according to claim 8, further satisfying the following conditional equation (4):
(4) $3.9 < f1L/fw < 5.9$, where f1L is a focal length of a lens closest to an image side of the first lens group.

12. The zoom lens according to claim 8, wherein at least one face in the first lens group is an aspherical surface.

13. The zoom lens according to claim 12, wherein a lens closest to the image side of the first lens group is an aspherical lens.

14. An image capturing apparatus comprising:
a zoom lens that includes a plurality of lens groups and performs zooming by varying distances between the plurality of lens groups; and
an imaging device that converts an optical image formed by the zoom lens into an electric signal,
wherein the zoom lens is an inner focus type zoom lens including a first lens group that has positive refracting power and is normally located at a fixed position, a second lens group that has negative refracting power and is movable in an optical axis direction for zooming, a third lens group that has positive refracting power, a fourth lens group that is movable for correction of a focal position due to the zooming and for focusing, and a fifth lens group that has positive refracting power, in order from an object side, wherein the first lens group includes a negative lens, a first positive lens, and a second positive lens arranged in order from the object side, wherein a first face of the negative lens has a shape of a concave surface turned on the object side, and wherein the zoom lens satisfies the following conditional equation (1):

(1) $-10.0 < G1R1/fw < -3.0$, where G1R1 is a curvature radius of a lens surface closest to the object side, and fw is a focal length of the overall lens system at the wide-angle end.

15. The image capturing apparatus according to claim 14, further satisfying the following conditional equation (2):

$$-8.0 < G1R1/fw < -5.0 \qquad (2).$$

16. The image capturing apparatus according to claim 14, further satisfying the following conditional equation (3):

(3) $0.03 < H1'/f1 < 0.3$, where H1' is a distance between a vertex of a face closest to an image side of the first lens group and a main point of the image side of the first lens group, and f1 is a focal length of the first lens group.

17. The image capturing apparatus according to claim 14, further satisfying the following conditional equation (4):

(4) $3.9 < f1L/fw < 5.9$, where f1L is a focal length of a lens closest to an image side of the first lens group.

18. The image capturing apparatus according to claim 14, wherein at least one face in the first lens group is an aspherical surface.

19. The image capturing apparatus according to claim 18, wherein a lens closest to the image side of the first lens group is an aspherical lens.

20. The image capturing apparatus according to claim 14, wherein the fifth lens group includes a front group having negative refracting power and a rear group having positive refracting power in order from the object side, and wherein any one of the front group and the rear group is moved in a direction perpendicular to the optical axis, and thereby an image formed on an image surface is also moved in the direction perpendicular to the optical axis.

* * * * *